United States Patent [19]

Moir et al.

[11] Patent Number: 5,732,458
[45] Date of Patent: Mar. 31, 1998

[54] PROCESS FOR ASSEMBLING A CLAMP RING TO A DISK STACK ASSEMBLY

[75] Inventors: Michael B. Moir; Khosrow Mohajerani, both of Newbury Park, Calif.

[73] Assignee: Seagate Technology, Inc., Scotts Valley, Calif.

[21] Appl. No.: 638,815

[22] Filed: Apr. 29, 1996

Related U.S. Application Data

[62] Division of Ser. No. 422,057, Apr. 14, 1995, abandoned.
[51] Int. Cl.$^6$ .................................................. G11B 5/42
[52] U.S. Cl. ........................... 29/603.03; 360/98.08; 360/99.12
[58] Field of Search .................... 29/603.03; 360/98.08, 360/99.12

[56] References Cited

U.S. PATENT DOCUMENTS 5,274,517  12/1993  Chen ................................ 360/98.08
5,414,575   5/1995  Katakura .......................... 360/98.08

Primary Examiner—Carl E. Hall
Attorney, Agent, or Firm—Merchant, Gould, Smith, Edell, Welter & Schmidt

[57] ABSTRACT

A clamp ring for a disk stack assembly of a computer disk drive unit includes a lower surface which includes an arcuate rolling contact surface that uniformly distributes a load applied to the clamp ring to components of the disk stack assembly underlying the clamp ring without damaging such disk stack components on load-induced flexion of the clamp ring. A cantilevered section of the clamp ring is disposed radially inwardly of the arcuate rolling contact surface, and is defined by a portion of the lower surface which is raised relative to an adjacent portion of the arcuate rolling contact surface so as to not contact the underlying disk stack components on load-induced flexion of the clamp ring. In use, the clamp ring is heated and then placed over the disk stack components to be clamped together. An axial load is applied to the clamp ring which causes it to flex and thus move contact between the lower surface of the clamp ring and the underlying disk stack components radially along the arcuate rolling contact surface. The axial force is maintained until the clamp ring cools sufficiently to hold the clamp ring in place, and then the axial load is removed.

11 Claims, 3 Drawing Sheets

PROCESS FOR ASSEMBLING A CLAMP RING TO A DISK STACK ASSEMBLY

This is a division, of application Ser. No. 08/422,057, filed Apr. 14, 1995, abandoned.

BACKGROUND OF THE INVENTION

This invention relates generally to improvements in computer disk drives. More particularly, the present invention relates to a computer disk drive unit having a clamp ring which incorporates an arcuate rolling contact surface that prevents disk distortion during assembly of the clamp ring to a disk stack assembly.

In recent years microcomputer equipment, particularly personal and desk top computers, have become extremely popular for a wide variety of home, business and commercial uses. Such computers commonly include a main central processor unit having one or more memory storage disks. In many modern computers, the storage disk or disks, sometimes referred to as "hard disks," are provided as part of a Winchester-type disk drive unit having the storage disks supported in a stack on a rotary spindle within a substantially sealed disk drive housing. The disks are rotatably driven in unison by a small spindle motor, and one or more electromagnetic heads on a movable positioning arm are displaced by a precision stepper motor to traverse surfaces of the rotating disks for purposes of reading and writing data. Such Winchester-type disk drive units are generally preferred in comparison with so-called floppy type disk drives due to their higher memory storage capacities and faster operating speeds.

With the steadily increasing popularity of personal-sized computers, various standard computer components have evolved to accommodate installation into computers produced by different manufacturers and/or to ensure compatibility with commercially available software. In this regard, Winchester-type disk drive units having one or more memory storage disks of an approximate 5.25 inch diameter have been manufactured and used on an industry-wide basis. More recently, smaller and lighter Winchester-type disk drives having storage disks of about 3.74 inches in diameter have become available. For either diametric size, the disk drive units have been produced in standardized vertical profile sizes to permit installation into a computer as an original equipment item, or as an after-market item to replace or upgrade an original disk drive unit. Disk drive units have been manufactured with a vertical dimension of about 3.25 inches to fit within a so-called "full height" vertical spacing, or with a vertical dimension of about 1.625 inches to fit within a so-called "half height" profile.

Typically, such computer disk drive units include a housing having a lower base and an upper removable cover which, collectively, define a disk storage compartment therebetween. A shaft is fixed to the lower base and extends upwardly therefrom toward the upper housing cover, and one or more memory storage disks are mounted for rotation within the disk storage compartment about the shaft. The shaft and the memory storage disks comprise a memory storage unit which, with other related components situated within the disk storage compartment, are manufactured to very precise manufacturing specifications in order to maximize the memory storage capabilities of the disk drive unit.

To hold the memory storage disks securely in place about the shaft, a clamp ring may be press-fit over a disk supporting hub to capture the memory storage disks and any intervening spacers between the clamp and a supporting flange. Due to the forces applied to the clamp ring during this assembly process, the clamp ring tends to flex, which may cause a relatively sharp corner thereof to dig into and distort the underlying media. When such distortion of the underlying media occurs, the disk drive unit may be subject to malfunction.

Accordingly, there has been a need for a novel clamp ring design and associated assembly process that prevents disk distortion resulting from engagement between a sharp corner of the clamp ring and the underlying media during the assembly process. Such a clamp ring design should not require modifications in other components of the disk drive assembly, and further should be adaptable for use with existing disk clamp installation tools. Moreover, such a clamp ring is needed which may be produced economically, and reliably serves its intended purpose without the aforementioned drawbacks of prior designs. The present invention fulfills these needs and provides other related advantages.

SUMMARY OF THE INVENTION

The present invention resides in a clamp ring for a disk stack assembly of a computer disk drive unit, and a related assembly process. The clamp ring comprises, generally, spaced-apart inner and outer walls, an upper surface extending between the inner and outer walls, and a lower surface spaced from the upper surface. The lower surface includes means for uniformly distributing a load applied to the clamp ring to components of the disk stack assembly underlying the clamp ring without damaging such disk stack assembly components on load-induced flexion of the clamp ring.

In a preferred form of the invention, the inner and outer walls are both cylindrical and are uniformly spaced from one another. The load distributing means includes an arcuate rolling contact surface designed to permit points of contact between the lower surface of the clamp ring and the underlying disk stack assembly components to move during load-induced flexion of the clamp ring without presenting a sharp edge which can damage or distort the underlying components. The radius of an arc of curvature of the arcuate rolling contact surface is greater than the outer diameter of the clamp ring. Moreover, the radius of the arc of curvature of the arcuate rolling contact surface is greater than twice the inner diameter of the clamp ring.

A cantilevered section of the clamp ring is disposed radially inwardly of the arcuate rolling contact surface. The cantilevered section is defined by a portion of the lower surface disposed radially inwardly of the arcuate rolling contact surface and raised relative thereto so as to not contact the disk stack components on load-induced flexion of the clamp ring. This portion of the lower surface is raised approximately ten percent of the maximum height of the clamp ring.

In a process for assembling the clamp ring to the disk stack assembly, the clamp ring is first heated to increase the inner diameter thereof to permit the clamp ring to slip over the outer diameter of a hub for the disk stack assembly. The clamp ring is then placed over the hub so that the arcuate rolling contact surface bears against the underlying disk stack components. An axial load is then applied to the clamp ring which causes it to flex, thus moving contact between the lower surface of the clamp ring and the underlying disk stack components radially along the arcuate rolling contact surface. The axial load is maintained until the clamp ring cools sufficiently to reduce the inner diameter thereof to firmly clamp against the hub, at which time the axial load may be removed from the clamp ring.

The construction of the clamp ring, and particularly the provision of the arcuate rolling contact surface, avoids the transfer of the axial load to the underlying disk stack components through a sharp corner of the clamp ring. This, advantageously, prevents distortion of the underlying media which results when sharp corners are presented on flexion of the clamp ring under the applied load.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
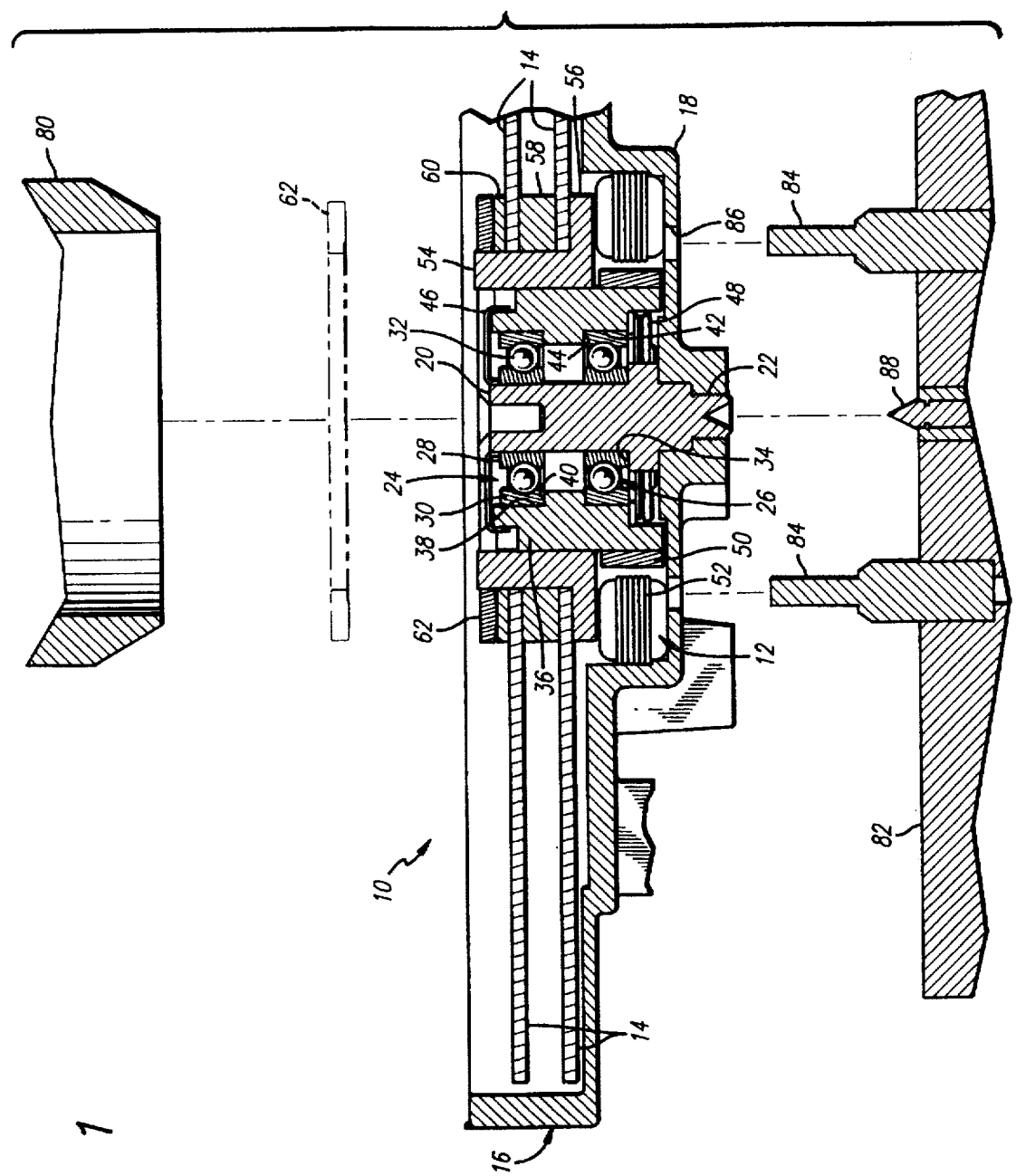
FIG. 1 is an exploded fragmented elevational sectional view through a disk drive unit disposed between upper and lower components of a disk clamp installation tool, illustrating, generally, the manner in which the disk clamp installation tool is utilized to assemble a clamp ring embodying the present invention to a disk stack assembly.

As shown in the drawings for purposes of illustration, the present invention is concerned with an improved disk drive unit, generally designated in the accompanying drawings by the reference number 10. The disk drive unit 10 includes a spindle motor 12 for rotatably driving a stack of memory storage disks 14 arranged to fit within the vertical profile available to the disk drive unit 10.

The disk drive unit 10 comprises a so-called "hard" disk drive of the general type used in modern personal computers and the like. The disk drive unit 10 conventionally includes a substantially sealed housing 16 defined by a rigid lower base 18 and a removable upper housing cover (not shown). The housing 16 has an overall size and shape with generally standardized external dimensions selected to fit within a limited installation envelope within a cabinet for a central processor unit of a computer.

As is generally known in the art, the illustrative disk drive unit 10 includes a head positioner assembly (not shown) mounted within the housing 16 at a position alongside the disk stack. The head positioner assembly supports a plurality of individual arms having electro-magnetic heads at the distal ends thereof in close proximity with respective upper and lower surfaces on the disks 14. A suitable actuator motor such as a movable coil DC motor, and a corresponding motor controller function to displace the heads through generally radial traverses relative to the disks 14 for purposes of reading and writing data, all in a well known manner.

With reference to FIG. 1, a central shaft 20 is securely fixed to a portion of the housing lower base 16, and the memory storage disks 14 are mounted for rotational movement within the housing 16 about the shaft 20. The shaft 20 includes a lower threaded end 22 that, typically, passes through the housing lower base 18 and is secured in place.

The shaft 20 is formed by machining or the like to accommodate predetermined positional mounting of upper and lower bearing units 24 and 26. More specifically, the two bearing units 24 and 26 comprise a pair of precision ball bearing units each having an annular inner race 28 cooperating with an annular outer race 30 to contain an annular array of bearing balls 32 therebetween. The upper bearing unit 24 is positioned adjacent to an upper end of the shaft 20, and the lower bearing unit 26 is positioned in a downward spaced relation to the upper bearing unit 24 toward a position with its inner race 28 seated against an axially upwardly presented shoulder stop 34 on the shaft 20.

The outer races 30 of the two bearing units 24 and 26 rotatably support a generally cylindrical hub core 36 constituting the rotor of the spindle motor 12. The outer race 30 of the upper bearing unit 24 is secured directly within an upper bore 38 of the hub core 36 in seated relation against a shoulder stop 40. Similarly, the outer race 30 of the lower bearing unit 26 is secured directly within a lower bore 42 of the hub core 36 in seated relation against a shoulder stop 44.

The rotary interfaces between the shaft 20 and the hub core 36 are sealed to prevent migration of bearing contaminants or the like into contact with the memory storage disks 14. Although the specific structure of the requisite sealing means may vary, a conventional labyrinth seal 46 is utilized adjacent to the upper bearing unit 24, and a conventional exclusion ferro-fluid seal unit 48 is utilized adjacent to the lower bearing unit 26.

The hub core 36 supports, at its lower end, a plurality of permanent magnets 50 which interact with an electro-magnetic stator core 52 to rotate the hub core 36 about the shaft 20 in a known manner. The hub core 36 also supports an outer disk supporting hub 54, which supports the stack of storage disks 14 for rotation within the disk drive housing 16. In this regard, the disks 14 are stacked upon a lower outer support flange 56 of the supporting hub 54. The disks 14 are separated from each other by an intervening spacer ring 58 of precision height, thereby orienting the disks 14 in a precision spacing for access therebetween of the various heads discussed previously. An upper spacer ring 60 overlies the uppermost disk 14, and a clamp ring 62, to be discussed in greater detail below, is fastened onto the upper end of the outer disk supporting hub 54 to compress the stack of disks 14 and related spacer rings 58 and 60. When so assembled, as the hub core 36 is driven during motor operation, the group of disks 14 are rotated as a collective unit.

Figure 2:
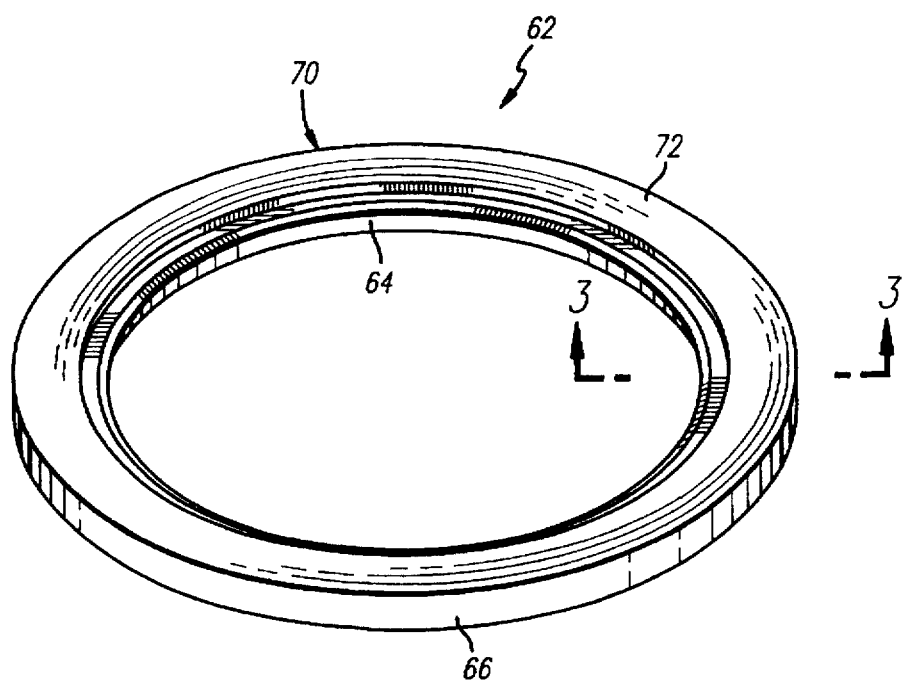
FIG. 2 is a bottom and side perspective view of the disk clamp illustrated in FIG. 1.
Figure 3:
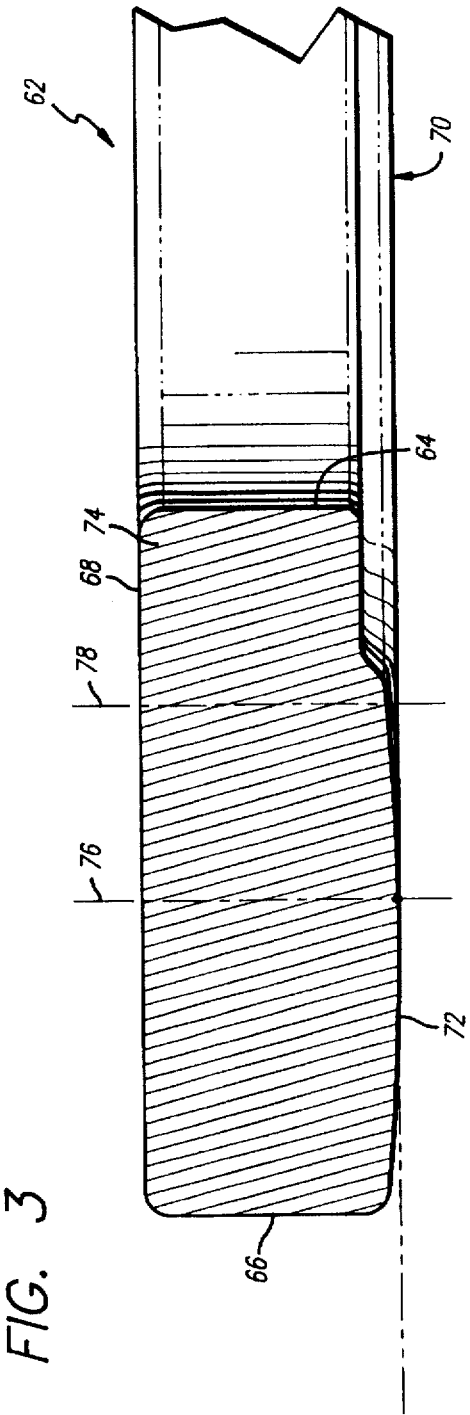
FIG. 3 is an enlarged fragmented elevational sectional view taken generally along the line 3—3 of FIG. 2, wherein the disk clamp has been inverted back to its proper configuration for placement over a stack of memory storage disks.
Figure 4:
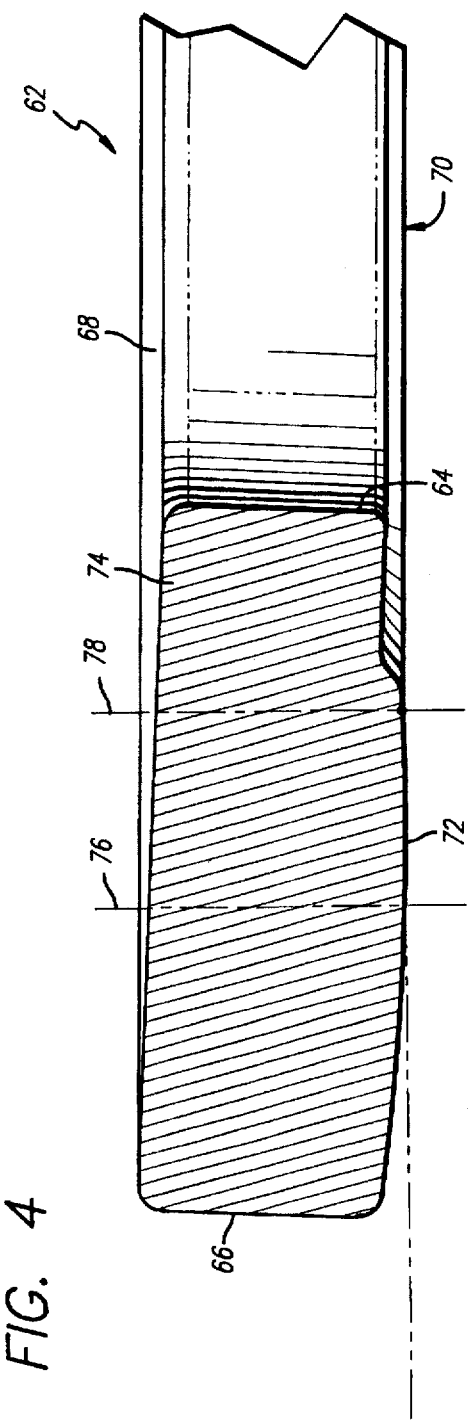
FIG. 4 is a fragmented elevational sectional view similar to that shown in FIG. 3, illustrating flexion of the disk clamp as a force is applied thereto during an assembly process.

In accordance with the present invention, and with reference to FIGS. 2–4, the clamp ring 62 is preferably manufactured of an aluminum alloy and includes an inner cylindrical wall 64, an outer cylindrical wall 66 which is uniformly spaced from the inner cylindrical wall, and upper and lower surfaces 68 and 70 which are spaced from one another and extend between the inner and outer walls. The lower surface 70 includes an arcuate rolling contact surface 72 that provides means for uniformly distributing a load applied to the clamp ring 62 to components of a disk stack assembly underlying the clamp ring without damaging such disk stack components on load-induced flexion of the clamp ring. In this regard, the disk stack assembly components include the underlying portions of the memory storage disks 14 and the spacer rings 58 and 60.

A cantilevered section 74 of the clamp ring 62 is disposed radially inwardly of the arcuate rolling contact surface 72, and is defined by a portion of the lower surface 70 which is raised relative to the arcuate rolling contact surface 72 so as to not contact the underlying disk stack components on load-induced flexion of the clamp ring.

With reference to FIGS. 3 and 4, the exemplary clamp ring 62 has an inner diameter at the inner cylindrical wall 64 of 0.9597 inch, and an outer diameter at the outer cylindrical wall 66 of 1.250 inch. The center of the arcuate rolling contact surface 72, indicated by the line 76, has a diameter of 1.120 inch. The radius of an arc of curvature of the arcuate rolling contact surface 72 is 2.0 inches. The overall height of the clamp ring 62 is 0.050 inch, and the height of the cantilevered section is 0.045 inch.

Typically, during installation of the clamp ring 62 over the outer disk supporting hub 54, a downwardly directed force is applied to the plane upper surface 68 of the cantilevered section 74. This downwardly directed force causes flexion of the clamp ring 62 as illustrated in FIG. 4. Thus, the primary line of contact between the clamp ring 62 and the underlying stack assembly component (the upper spacer ring 60) shifts from the intersection of the line 76 with the arcuate rolling contact surface 72 to the intersection of the line 78 with the contact surface 72. Advantageously, no sharp corner is presented by the clamp ring 62 during such flexion which could dig into and distort the underlying media.

With reference once again to FIG. 1, an installation assembly is utilized to secure the clamp ring 62 about the supporting hub 52 over the upper spacer ring 60. The installation assembly is shown in the form of a disk clamp installation tool comprising an upper ram 80 and a lower nest assembly 82. The nest assembly 82 is provided with a plurality of housing positioning pins 84 which engage apertures 86 in the housing 16 of the disk drive unit 10, and a shaft positioning pin 88 that engages the lower threaded end 22 of the central shaft 20.

Figure 5:
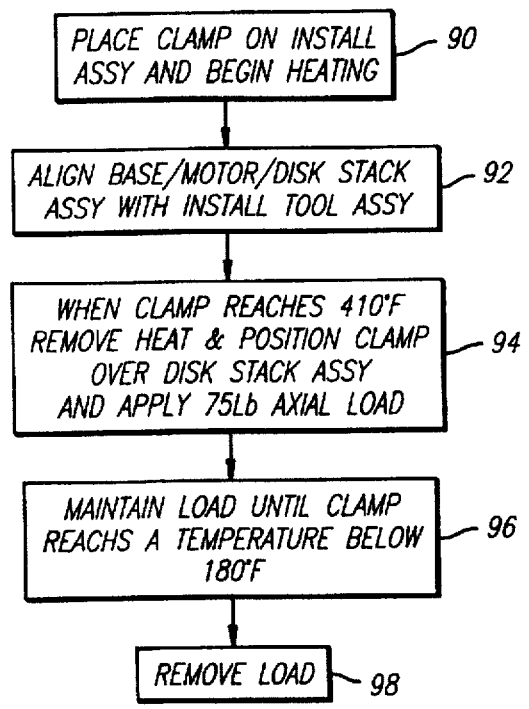
FIG. 5 is a flow chart illustrating the steps utilized to assemble the clamp ring to the disk stack assembly.

Referring now to FIG. 5, a process for assembling the clamp ring 62 to a disk stack assembly of the computer disk drive unit 10 is illustrated. First, as referenced in block 90, the clamp ring 62 is installed on the ram 80 and heated to 410°F. The clamp ring 62 is heated to increase the inner diameter of the clamp ring at the inner wall 64, to permit it to slip over the outer diameter of the outer disk supporting hub 54. While the clamp ring 62 is being heated, the disk drive unit 10 is placed onto the nest assembly 82 to align the disk stack assembly of the disk drive unit 10 with the clamp ring 62 (block 92). When the clamp ring 62 reaches 410°F., the heat is removed and the ram 80 is utilized to position the clamp ring over the disk stack assembly and apply a seventy-five pound axial load thereto (block 94). Application of the seventy-five pound load will cause the clamp ring 62 to deflect, thus rolling the contact point between the arcuate rolling contact surface 72 and the upper spacer ring 60 from the point indicated by the line 76 to the point indicated by the line 78.

The axial load is maintained on the the clamp ring 62 and the underlying disk stack components until the clamp ring cools to a temperature below 180°F. (block 96). This ensures that the inner diameter of the clamp ring 62 shrinks sufficiently to securely grip the outer diameter of the supporting hub 54, thus preventing movement of the clamp ring 62 relative to the supporting hub 54 and maintaining the seventy-five pound load on the underlying memory storage disks 14 and spacer rings 58 and 60. The axial load is then removed from the clamp ring 62 (block 98), and the partially assembled disk drive unit 10 is then removed from the nest assembly 82 of the installation tool.

From the foregoing it will be appreciated that the novel clamp ring 62 of the present invention provides effective means for uniformly distributing a load applied to the clamp ring to components of the disk stack assembly underlying the clamp ring without damaging such disk stack components on load-induced flexion of the clamp ring. This is accomplished by eliminating the possibility that a sharp corner of the clamp ring 62 can dig into and distort the underlying media which may cause malfunction of the disk drive unit.

Although a particular embodiment of the invention has been described in detail for purposes of illustration, various modifications may be made without departing from the spirit and scope of the invention. Accordingly, the invention is not to be limited, except as by the appended claims.

We claim:

1. A process for assembling a clamp ring to a disk stack assembly of a computer disk drive unit, comprising the steps of:

placing a lower surface of the clamp ring over components of the disk stack assembly to be clamped together such that only a portion of the lower surface comprising an arcuate rolling contact surface bears against the underlying disk stack assembly components;

applying an axial load to the clamp ring causing the clamp ring to flex, thus moving contact between the lower surface and the underlying disk stack assembly components radially along the arcuate rolling contact surface; and removing the axial load from the clamp ring.

2. The process of claim 1, including the step of heating the clamp ring to increase an inner diameter thereof prior to the placing step.

3. The process of claim 2, including the step of allowing the clamp ring to cool to reduce the inner diameter thereof prior to the removing step.

4. The process of claim 1, wherein during the applying step the contact between the arcuate rolling contact surface and the underlying disk stack assembly components avoids transfer of the axial load to the underlying disk stack assembly components through a sharp corner of the clamp ring.

5. A process for assembling a clamp ring to a disk stack assembly of a computer disk drive unit, comprising the steps of:

heating the clamp ring to increase an inner diameter thereof;

positioning a lower surface of the clamp ring over components of the disk stack assembly to be clamped together such that only a portion of the lower surface bears against the underlying disk stack assembly components;

applying an axial load to the clamp ring;

allowing the clamp ring to cool to reduce the inner diameter thereof; and removing the axial load from the clamp ring.

6. The process of claim 5, including the step of installing the clamp ring onto a ram of a clamp installation tool prior to the heating step.

7. The process of claim 6, including the step of placing the disk drive unit into a nest assembly of a clamp installation tool prior to the positioning step.

8. The process of claim 5, wherein the applying step includes the step of applying a seventy-five pound axial load to the clamp ring.

9. The process of claim 8, wherein the lower surface of the clamp ring comprises an arcuate rolling contact surface, and wherein during the applying step the axial load causes the clamp ring to flex thus moving contact between the lower surface and the underlying disk stack assembly components radially along the arcuate rolling contact surface.

10. The process of claim 9, wherein during the applying step the contact between the arcuate rolling contact surface and the underlying disk stack assembly components avoids transfer of the axial load to the underlying disk stack assembly components through a sharp corner of the clamp ring.

11. A process for assembling a clamp ring to a disk stack assembly of a computer disk drive unit, comprising the steps of:

heating the clamp ring to increase an inner diameter thereof;

placing a lower surface of the clamp ring over components of the disk stack assembly to be clamped together such that only a portion of the lower surface comprising an arcuate rolling contact surface bears against the underlying disk stack assembly components;

applying an axial load to the clamp ring causing the clamp ring to flex, thus moving contact between the lower surface and the underlying disk stack assembly components radially along the arcuate rolling contact surface and in a manner that avoids transfer of the axial load to the underlying disk stack assembly components through a sharp corner of the clamp ring;

allowing the clamp ring to cool to reduce the inner diameter thereof; and removing the axial load from the clamp ring.

* * * * *